United States Patent
Motiwala et al.

(10) Patent No.: US 11,522,752 B2
(45) Date of Patent: Dec. 6, 2022

(54) WIRELESS COMMUNICATION NETWORK OPERATOR DEFINED DNS SERVER SELECTION

(71) Applicant: T-Mobile USA, Inc., Bellevue, WA (US)

(72) Inventors: Aziz Motiwala, Mill Creek, WA (US); Kameswaran Arunachalam, Redmond, WA (US); Ramesh Kalathur, Fairfax, VA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 17/163,839

(22) Filed: Feb. 1, 2021

(65) Prior Publication Data
US 2022/0247622 A1   Aug. 4, 2022

(51) Int. Cl.
| H04W 48/06 | (2009.01) |
| H04L 41/0803 | (2022.01) |
| H04L 69/324 | (2022.01) |
| H04L 43/08 | (2022.01) |
| H04W 76/10 | (2018.01) |
| H04L 61/4511 | (2022.01) |
| H04L 61/5007 | (2022.01) |

(52) U.S. Cl.
CPC .......... *H04L 41/0803* (2013.01); *H04L 43/08* (2013.01); *H04L 61/4511* (2022.05); *H04L 61/5007* (2022.05); *H04L 69/324* (2013.01); *H04W 48/06* (2013.01); *H04W 76/10* (2018.02)

(58) Field of Classification Search
CPC . H04L 41/0803; H04L 43/08; H04L 61/1511; H04L 61/2007; H04L 69/324; H04W 76/10; H04W 76/48; H04W 76/06
See application file for complete search history.

(56) References Cited

U.S. PATENT DOCUMENTS

| 2002/0131395 | A1* | 9/2002 | Wang | H04W 92/24 370/349 |
| 2016/0197898 | A1* | 7/2016 | Hozza | H04L 63/0442 713/168 |
| 2017/0142060 | A1* | 5/2017 | Thakar | H04L 61/1511 |
| 2017/0339189 | A1* | 11/2017 | Leong | G06F 8/654 |

* cited by examiner

*Primary Examiner* — Viet D Vu
(74) *Attorney, Agent, or Firm* — Lee & Hayes, P.C.

(57) ABSTRACT

Systems and methods discussed herein are directed to method for connecting a communication device to a data network via a network, e.g., a wireless communication network, and preventing the communication device from overriding a DNS selection by an operator of the network. The method includes receiving, from a communication device, e.g., an electronic device, a request to connect to a data network, e.g., the Internet, via a wireless communication network. A response message may be provided to the communication device, where the response message comprises (i) a configuration setting for the communication device to use domain name system (DNS) internet protocol (IP) addresses provided by an operator of the wireless communication network when accessing the data network and (ii) a data bit disabling the communication device from overriding the configuration setting. Connection of the communication device to the data network is then facilitated via the wireless communication network.

20 Claims, 5 Drawing Sheets

WIRELESS COMMUNICATION NETWORK OPERATOR DEFINED DNS SERVER SELECTION

BACKGROUND

Electronic devices are increasingly used to execute various applications (apps), for example, games, accessing Internet websites, location services, music, video, etc. Examples of such electronic devices include, for example, mobile communication devices such as, for example, smart phones, portable computers, notebooks, laptops, etc., and other types of computing devices, both mobile and stationary.

When users of electronic devices utilize apps via services provided by a network, e.g., a wireless communication network, the use of the apps may connect the electronic devices to a Domain Name System (DNS) server to access the Internet. The DNS is usually owned and/or operated by an operator of the wireless communication network. The DNS server can thus provide data related to apps being used by the electronic device including data related to execution of the apps as well as Internet websites accessed by the electronic devices.

Based on the data provided by the DNS server, the operator of the wireless communication network may offer services at a discount (or even free), e.g., special offers or rewards, to users of the electronic devices in order to incentivize the users of the electronic devices to utilize services, e.g., use data, provided by the wireless communication network.

Some original equipment manufacturers (OEMs) of electronic devices are configuring electronic devices to allow users of their electronic devices to select a third party encrypted DNS thereby overriding a selection of the DNS by the operator of the wireless communication network. Also, some OEMs may configure their electronic devices to automatically select a third party encrypted DNS server thereby overriding a selection of the DNS by the operator of the wireless communication network. Thus, the data that is usually obtained from the DNS server by the operator of the wireless communication network is no longer available to the operator of the wireless communication network.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Techniques and architecture are described herein for preventing an electronic device configured to operate in a wireless communication network from overriding a DNS selection by the operator of the wireless communication network. In particular, when an electronic device attempts to establish a session with a public data network (PDN) gateway (PGW), the PGW may respond with DNS Internet Protocol (IP) addresses for DNS servers for the electronic device to use and a DNS override flag set to positive to prevent the electronic device from overriding use of the DNS IP addresses.

For example, a method in a wireless communication network may include receiving, from a communication device, e.g., an electronic device, a request to connect to a data network, e.g., the Internet, via a wireless communication network. A response message may be provided to the communication device, where the response message comprises (i) a configuration setting for the communication device to use domain name system (DNS) internet protocol (IP) addresses provided by an operator of the wireless communication network when accessing the data network and (ii) a data bit disabling the communication device from overriding the configuration setting. Connection of the communication device to the data network is then facilitated via the wireless communication network.

In configurations, the method may further include receiving, from the communication device, a packet data protocol (PDP) connectivity request, where the PDP connectivity request comprises a request for an identity of the DNS of the wireless communication network. A PDP connectivity response may be provided to the communication device, where the PDP connectivity response comprises the identity of the DNS of the wireless communication network.

In configurations, receiving, from the communication device, the request to connect to the data network via the wireless communication network may comprise receiving, from the communication device, a create session request. Additionally, in configurations, providing, to the communication device, the response message may comprise providing, to the communication device, a create session response, where the create session response comprises (i) a configuration setting for the communication device to use domain name system (DNS) internet protocol (IP) addresses provided by the operator of the wireless communication network when accessing the data network and (ii) the data bit disabling the communication device from overriding the configuration setting.

The method may further comprise, in configurations, monitoring data traffic of the communication device with respect to the data network via the wireless communication network. In configurations, based at least in part on the data traffic, the method may include offering a service to a user of the communication device. In configurations, the service may comprise one or more of (i) additional data allowance, (ii) one or more offers with respect to websites visited, (iii)

one or more offers with respect to gaming, or (iv) one or more offers with respect to products.

Figure 1:
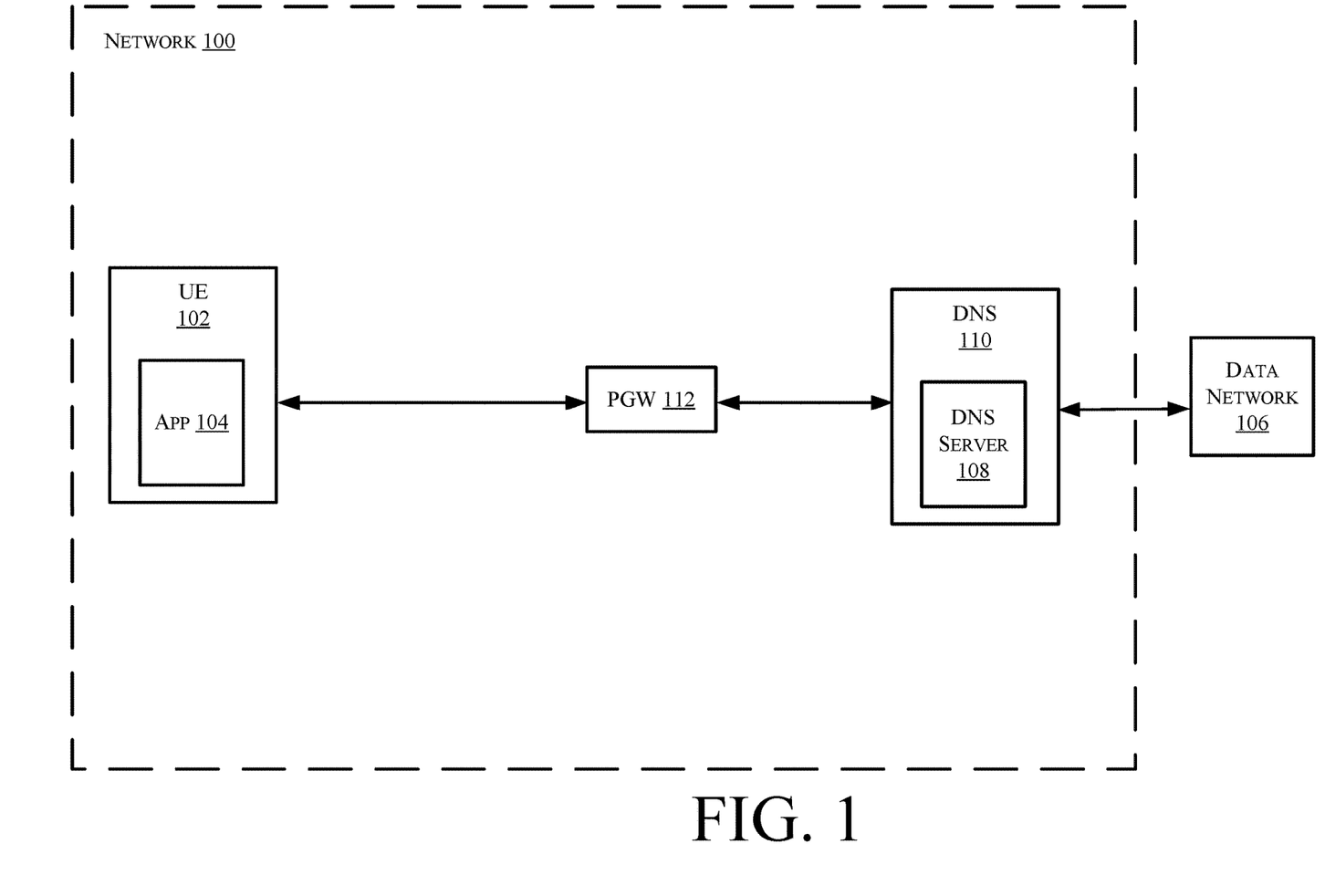
FIG. 1 schematically illustrates an example of a portion of a network configured as a wireless communication network, in accordance with various configurations.

FIG. 1 schematically illustrates an example of a network 100. In the example of FIG. 1, the network 100 is a wireless communication network. However, in configurations, the network 100 may be configured as another type of network and the example of FIG. 1 is not meant to be limiting. The network 100 includes a user equipment (UE) 102 configured for operation in the network 100. The UE 102 includes one or more apps 104. Generally, the network 100 includes numerous UEs 102 but only the UE 102 is illustrated for clarity purposes. Additionally, the network generally includes more elements than are illustrated in FIG. 1 but only select elements are illustrated for clarity purposes.

The network 100 and the UE 102 may be configured to operate according to according to one or more operating protocols, e.g., Long Term Evolution (LTE), 5G, Global System for Mobile Communications (GSM), Time Division Multiple Access (TDMA), Universal Mobile Telecommunications System (UMTS), Evolution-Data Optimized (EVDO), Advanced LTE (LTE+), Generic Access Network (GAN), Unlicensed Mobile Access (UMA), Code Division Multiple Access (CDMA), Orthogonal Frequency Division Multiple Access (OFDM), General Packet Radio Service (GPRS), Enhanced Data GSM Environment (EDGE), Advanced Mobile Phone System (AMPS), High Speed Packet Access (HSPA), evolved HSPA (HSPA+), Voice over IP (VoIP), Voice over LTE (VoLTE), IEEE 802.1x protocols, WiMAX, Wi-Fi, and/or any future IP-based network technology or evolution of an existing IP-based network technology, and/or the like.

The UE 102 may be implemented as any suitable device such as a mobile computing device configured to communicate over a wireless and/or wireline network, including, without limitation, a mobile phone (e.g., a smart phone), a tablet computer, a laptop computer, a portable digital assistant (PDA), a wearable computer (e.g., electronic/smart glasses, a smart watch, fitness trackers, etc.), a networked digital camera, a motor vehicle, and/or similar mobile devices. Although this description predominantly describes the UE 102 as being "mobile" (i.e., configured to be carried and moved around), it is to be appreciated that the UE 102 may represent various types of communication devices that are generally stationary as well, such as televisions, appliances, desktop computers, game consoles, set top boxes, and the like. In this sense, the terms "communication device," "wireless device," "wireless communication device," "wireline device," "mobile device," "mobile communication device," "computing device," "mobile computing device," and "user equipment (UE)" may be used interchangeably herein to describe any communication device capable of performing the techniques described herein. Furthermore, the UE 102 may be capable of communicating over wired networks, and/or wirelessly using any suitable wireless communications/data technology, protocol, or standard, such as those mentioned above.

In configurations, when the app 104 is executed within the network 100 the app may cause the UE 102 to access a data network 106, e.g., the Internet. Executing the app 104 and/or accessing the data network 106 generally requires consumption of data by the UE 102. In configurations, the data network 106 may be part of the network 100.

The UE 102 accesses the data network 106 via a DNS server 108 of a DNS 110. The UE 102 accesses the DNS server 108 via an IP address of the DNS server 108. In configurations, the DNS 110 is owned and/or operated by an operator of the network 100. In configurations, the DNS 110 may be part of the network 100 or may be external to the network 100. The network 100 generally includes multiple DNS servers 108.

In configurations, a public data network (PDN) gateway (PGW) 112 of the network 100 (e.g., the network 100 is configured as a wireless communication network) provides connectivity from the UE 102 to external PDNs, e.g., the data network 106 (e.g., the Internet), an Internet Protocol Multimedia Core Network Subsystem (IMS), etc., by being the network 100's point of exit and entry of traffic. Generally, the network 100 includes multiple PGWs 112 and the UE 102 may have simultaneous connectivity with more than one PGW for accessing multiple PDNs. The PGW 112 performs policy enforcement, packet filtering for each UE, charging support, lawful interception and packet screening.

In configurations, the UE 102 may send a packet data protocol (PDP) connectivity request to the PGW 112, where the PDP connectivity request comprises a request for an identity of the DNS 110 of the network 100 to connect to the data network 106, e.g., the Internet, via the network 100. The PGW 110 may send a PDP connectivity response message to the UE 102 identifying the DNS 110.

The UE 102 may send a create session request to the PGW 112 for the UE to connect to the data network 106. The PGW 112 may send a create session response, where the create session response includes a configuration setting for the UE 102 to use one or more DNS IP addresses of one or more DNS servers 108 when accessing the data network 106. The create session response may also include a data bit or flag disabling the UE 102 from overriding the configuration setting. Connection of the UE 102 to the data network 106 may then be facilitated.

In configurations, data traffic of the UE 102 may be monitored by the PGW 112 with respect to the data network 106 using deep packet inspection (DPI). In configurations, based at least in part on the data traffic, the operator of the network 100 may offer a service to a user of the UE 102. Examples of the service may include one or more of an additional data allowance, e.g., the operator may increase an amount of data available for use by the user without an additional fee, additional data at a reduced fee, one or more offers with respect to websites visited in the data network 106, one or more offers with respect to gaming, or one or more offers with respect to products. Other services may be offered and the list of examples of services is not meant to be limiting.

Figure 2:
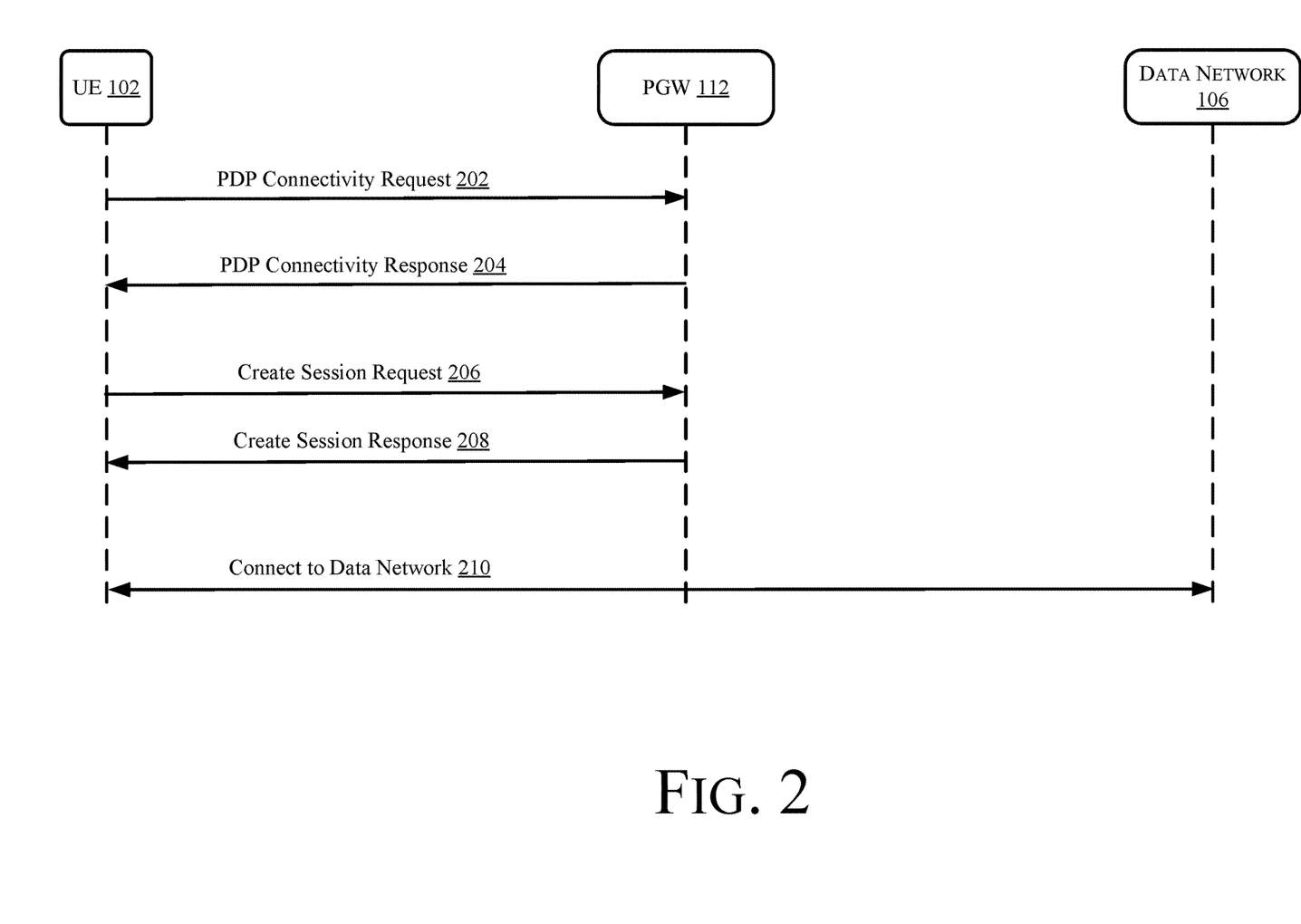
FIG. 2 schematically illustrates a flow diagram describing an example call flow sequence of providing access for a UE to a data network in communication with the network of FIG. 1, in accordance with various configurations.

FIG. 2 schematically illustrates a flow diagram describing an example call flow sequence of providing access for the UE 102 to the data network 106, in accordance with configurations. At 202, the UE 102 sends a PDP connectivity request to the PGW 112, where the PDP connectivity request comprises a protocol control operations (PCO) message from the UE 102 to the PGW 112 requesting an identity of the DNS 110 of the network 100 to connect to the data network 106, e.g., the Internet, via the network 100. At 204, the PGW 110 sends a PDP connectivity response to the UE 102 identifying the DNS 110.

At 206, the UE 102 sends a create session request to the PGW 112 for the UE to connect to the data network 106. At 208, the PGW 112 sends a create session response, where the create session response includes a PCO message from the PGW 112 to the UE 102 providing a configuration setting for the UE 102 to use one or more DNS IP addresses of one or more DNS servers 108 when accessing the data network 106. The create session response may also include a data bit or flag disabling the UE 102 from overriding the configuration setting. At 210, connection of the UE 102 to the data network 106 is then facilitated through one of the IP addresses of the DNS servers 108.

Figure 3:
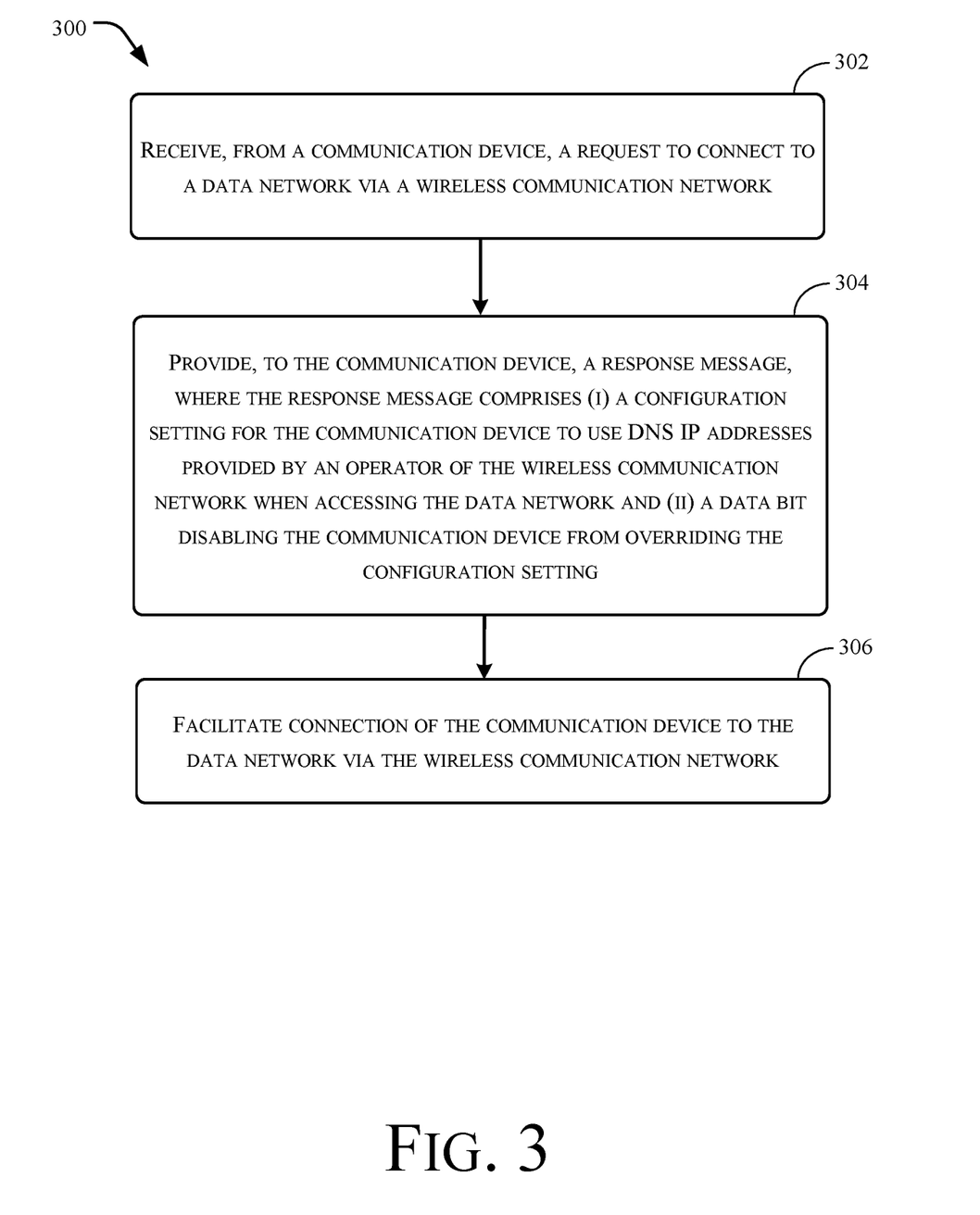
FIG. 3 is a flow diagram of an example process for connecting a UE to a data network via the network of FIG. 1 and preventing the UE from overriding a DNS selection by an operator of the network of FIG. 1, in accordance with various configurations.

FIG. 3 is a flow diagram of an illustrative process that may be implemented within or in association with the network 100. This process (as well as other processes described throughout) is illustrated as a logical flow graph, each operation of which represents a sequence of operations that can be implemented in hardware, software, or a combination thereof. In the context of software, the operations represent computer-executable instructions stored on one or more tangible computer-readable storage media that, when executed by one or more processor(s), perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the process. Furthermore, while the architectures and techniques described herein have been described with respect to wireless networks, the architectures and techniques are equally applicable to processor(s) and processing cores in other environments and computing devices.

FIG. 3 is a flow diagram of an example process 300 for connecting a communication device, e.g., UE 102, to a data network, e.g., the data network 106 via a network, e.g., network 100, and preventing the communication from overriding a DNS selection by an operator of the network. At block 302, a request to connect to a data network via a wireless communication network is received from the communication device. At block 304, a response message is provided to the communication device. The response message comprises (i) a configuration setting for the communication device to use DNS IP addresses provided by an operator of the wireless communication network when accessing the data network and (ii) a data bit disabling the communication device from overriding the configuration setting. At block 306, connection of the communication device to the data network via the wireless communication network is facilitated.

Figure 4:
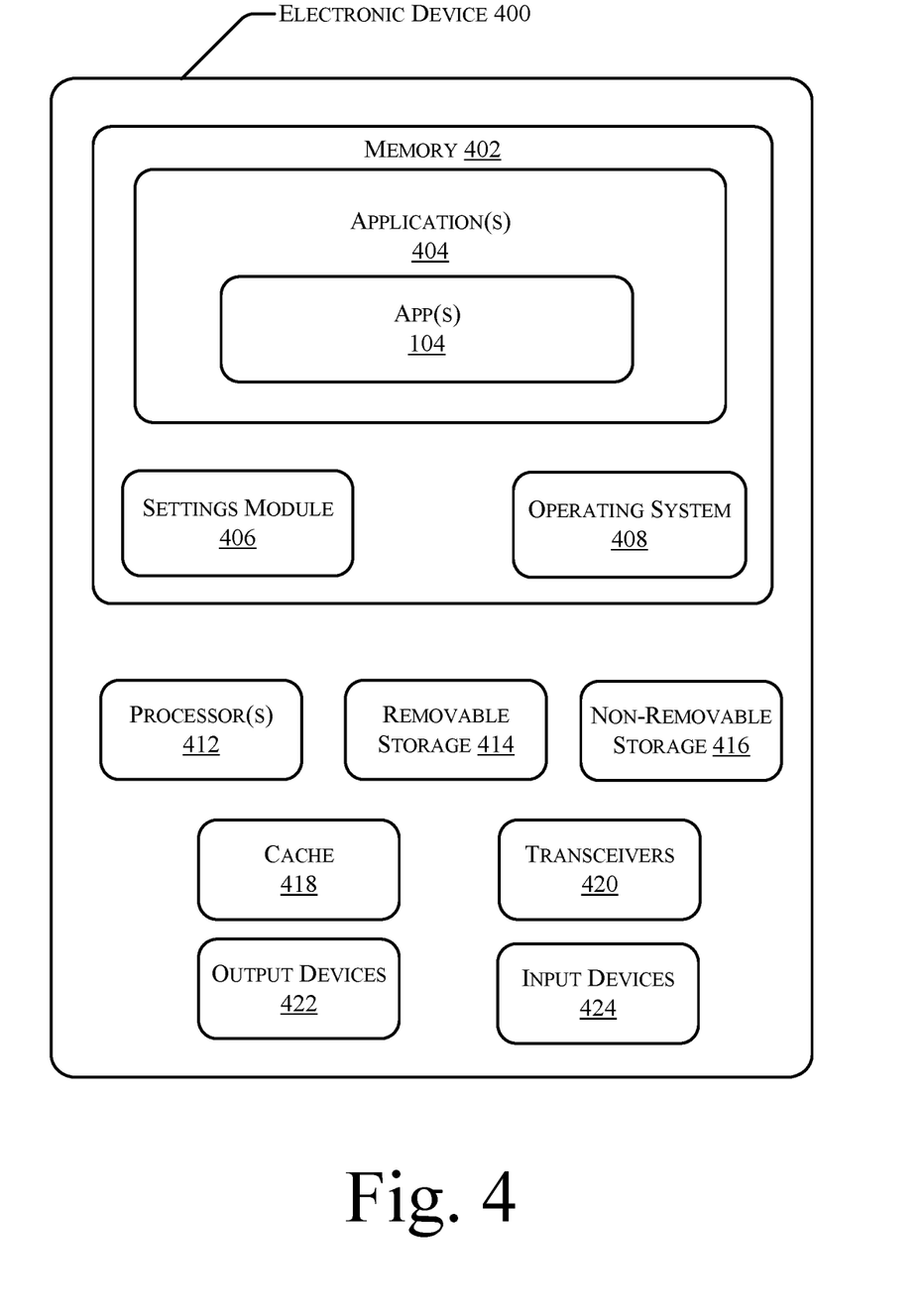
FIG. 4 schematically illustrates a component level view of an example electronic device configured for use in the network of FIG. 1, in accordance with various configurations.

FIG. 4 schematically illustrates a component level view of an example electronic device 400, such as UE 110, configured to function within network 100. The electronic device 400 may include more or less components depending on the type of electronic device. As illustrated, the electronic device 400 comprises a system memory 402, e.g., computer-readable media, storing application(s) 404, e.g., app(s) 104. The mobile device also comprises a settings module 406, and an operating system 408. Also, the electronic device 400 includes processor(s) 412, a removable storage 414, a non-removable storage 416, cache 418, transceivers 420, output device(s) 422, and input device(s) 424. In various implementations, system memory 402 is volatile (such as RAM), non-volatile (such as ROM, flash memory, etc.) or some combination of the two. In some implementations, the processor(s) 412 is a central processing unit (CPU), a graphics processing unit (GPU), or both CPU and GPU, or any other sort of processing unit.

The electronic device 400 may also include additional data storage devices (removable and/or non-removable) such as, for example, magnetic disks, optical disks, or tape. Such additional data storage may include removable storage 414 and non-removable storage 416. Additionally, the electronic device 400 includes cache 418.

Non-transitory computer-readable media may include volatile and nonvolatile, removable and non-removable tangible, physical media implemented in technology for storage of information, such as computer readable instructions, data structures, program modules, or other data. System memory 402, removable storage 414, non-removable storage 416 and cache 418 are all examples of non-transitory computer-readable media. Non-transitory computer-readable media include, but are not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other tangible, physical medium which can be used to store the desired information and which can be accessed by the electronic device 400. Any such non-transitory computer-readable media may be part of the electronic device 400. The processor(s) 412 may be configured to execute instructions, which may be stored in the non-transitory computer-readable media or in other computer-readable media accessible to the processor(s) 412.

In some implementations, the transceivers 420 include any sort of transceivers known in the art. For example, the transceivers 420 may include a radio transceiver that performs the function of transmitting and receiving radio frequency communications via an antenna (not shown). Also, or alternatively, the transceivers 420 may include wireless modem(s) to facilitate wireless connectivity with other computing devices. Further, the transceivers 420 may include wired communication components, such as an Ethernet port, for communicating with other networked devices.

In some implementations, the output devices 422 include any sort of output devices known in the art, such as a display (e.g., a liquid crystal display), speakers, a vibrating mechanism, or a tactile feedback mechanism. Output devices 422 also include ports for one or more peripheral devices, such as headphones, peripheral speakers, or a peripheral display.

In various implementations, input devices 424 include any sort of input devices known in the art. For example, input devices 424 may include a camera, a microphone, a keyboard/keypad, or a touch-sensitive display. A keyboard/keypad may be a push button numeric dialing pad (such as on a typical telecommunication device), a multi-key keyboard (such as a conventional QWERTY keyboard), or one or more other types of keys or buttons, and may also include a joystick-like controller and/or designated navigation buttons, or the like. The input devices 424 may be used to enter preferences of a user of the electronic device 400 to define how the user wishes certain calls from third parties to be handled by the wireless communication network, as previously described herein.

Some or all operations of the processes described above can be performed by execution of computer-readable instructions stored on a computer storage medium, as defined below. The term "computer-readable instructions" as used in the description and claims, include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like. Memory 402 is an example of computer storage media.

The computer storage media may include volatile memory (such as random access memory (RAM)) and/or non-volatile memory (such as read-only memory (ROM), flash memory, etc.). The computer storage media may also include additional removable storage and/or non-removable storage including, but not limited to, flash memory, magnetic storage, optical storage, and/or tape storage that may provide non-volatile storage of computer-readable instructions, data structures, program modules, and the like.

A non-transient computer storage medium is an example of computer-readable media. Computer-readable media includes at least two types of computer-readable media, namely computer storage media and communications media. Computer storage media includes volatile and non-volatile, removable and non-removable media implemented in any process or technology for storage of information such as computer-readable instructions, data structures, program modules, or other data. Computer storage media includes, but is not limited to, phase change memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanism. As defined herein, computer storage media do not include communication media.

The computer-readable instructions stored on one or more non-transitory computer storage media that, when executed by one or more processors, may perform operations described above with reference to FIGS. 1-3. Generally, computer-readable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

Figure 5:
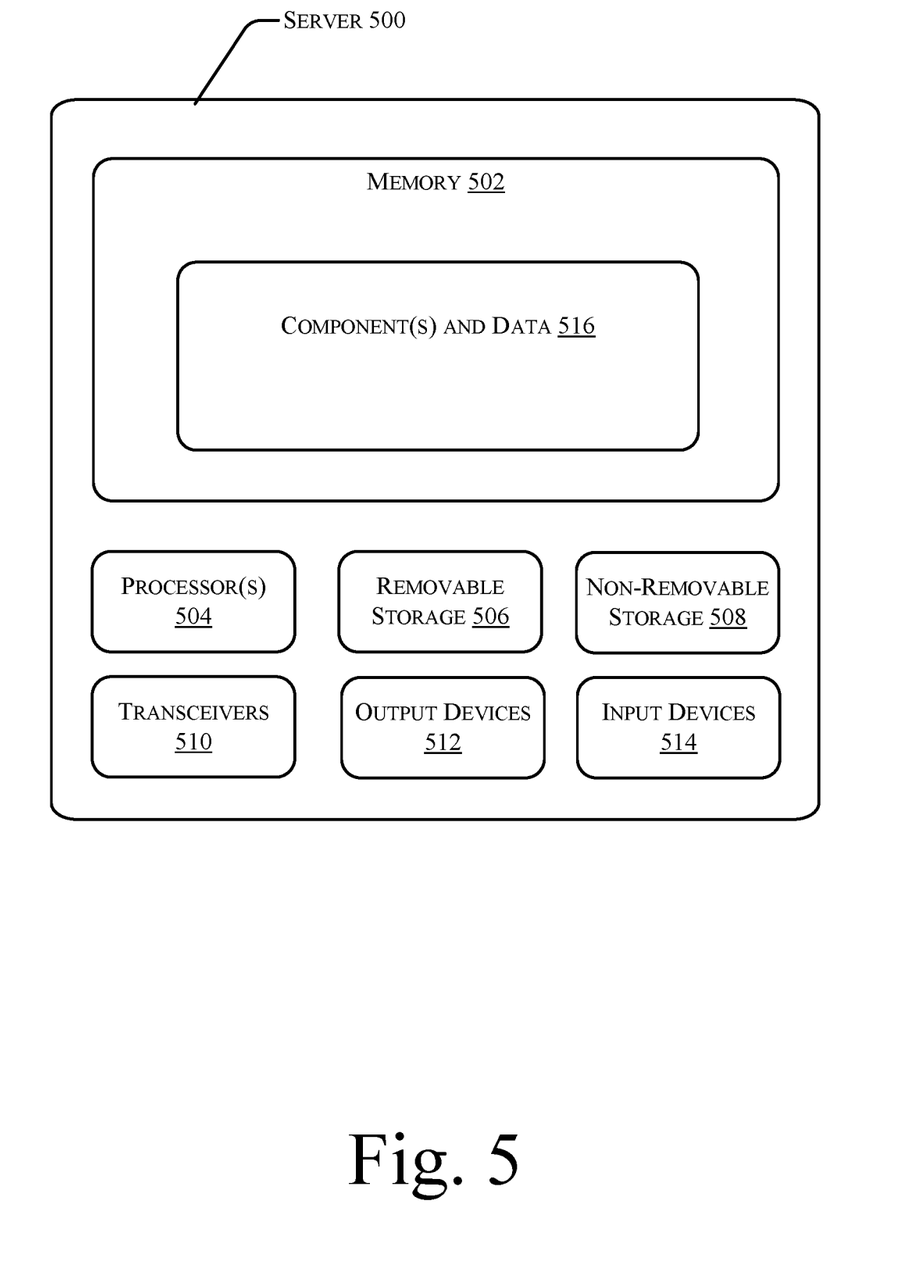
FIG. 5 schematically illustrates a component level view of a server configured for use in the network of FIG. 1 to provide various services of the network of FIG. 1, in accordance with various configurations.

FIG. 5 illustrates a component level view of a server 500 configured for use within a network, e.g., network 100, in order to provide various services within the network, according to the techniques described herein. For example, one or more servers 500 may be configured to operate as a PGW, e.g., the PGW 112, while one or more servers 500 may be configured to operate as one or more DNS servers 108. As illustrated, the server 500 comprises a system memory 502 that may store one or more components and/or applications and data 516 for interacting with electronic devices 400, e.g., UE 102, or other electronic devices that may be configured as connected devices, as described herein. Also, the server 500 may include processor(s) 504, a removable storage 506, a non-removable storage 508, transceivers 510, output device(s) 512, and input device(s) 514.

In various implementations, system memory 502 is volatile (such as RAM), non-volatile (such as ROM, flash memory, etc.), or some combination of the two. In some implementations, the processor(s) 504 is a Central Processing Unit (CPU), a Graphics Processing Unit (GPU), or both CPU and GPU, or any other sort of processing unit.

The server 500 may also include additional data storage devices (removable and/or non-removable) such as, for example, magnetic disks, optical disks, or tape. Such additional storage is illustrated in FIG. 5 by removable storage 506 and non-removable storage 508. The one or more of the memory 502, the removable storage 506 and/or the non-removable 508 may include component(s) and data 516 (illustrated in the memory 502). The component(s) and data 516 may include instructions executable by, for example, the processor(s) 504.

Non-transitory computer-readable media may include volatile and nonvolatile, removable and non-removable tangible, physical media implemented in technology for storage of information, such as computer readable instructions, data structures, program modules, or other data. System memory 502, removable storage 506 and non-removable storage 508 are all examples of non-transitory computer-readable media. Non-transitory computer-readable media include, but are not limited to, RAM, ROM, EEPROM, flash memory or other memory technology, CD-ROM, Digital Versatile Disks (DVD) or other optical storage, magnetic cassettes, magnetic tape, magnetic disk storage or other magnetic storage devices, or any other tangible, physical medium which can be used to store the desired information and which can be accessed by the server 500. Any such non-transitory computer-readable media may be part of the server 500.

In some implementations, the transceivers 510 include any sort of transceivers known in the art. For example, the transceivers 510 may include wired communication components, such as an Ethernet port, for communicating with other networked devices. Also, or instead of, the transceivers 510 may include wireless modem(s) to facilitate wireless connectivity with other computing devices. Further, the transceivers 510 may include a radio transceiver that performs the function of transmitting and receiving radio frequency communications via an antenna.

In some implementations, the output devices 512 include any sort of output devices known in the art, such as a display (e.g., a liquid crystal display), speakers, a vibrating mechanism, or a tactile feedback mechanism. Output devices 512 also include ports for one or more peripheral devices, such as headphones, peripheral speakers, or a peripheral display.

In various implementations, input devices 514 include any sort of input devices known in the art. For example, input devices 514 may include a camera, a microphone, a keyboard/keypad, a computer mouse, or a touch-sensitive display. A keyboard/keypad may be a push button numeric dialing pad (such as on a typical telecommunication device), a multi-key keyboard (such as a conventional QWERTY keyboard), or one or more other types of keys or buttons, and may also include a joystick-like controller and/or designated navigation buttons, or the like.

Some or all operations of the processes described above can be performed by execution of computer-readable instructions stored on a computer storage medium, as defined below. The term "computer-readable instructions" as used in the description and claims, include routines, applications, application modules, program modules, programs, components, data structures, algorithms, and the like. Computer-readable instructions can be implemented on various system configurations, including single-processor or multi-processor systems, minicomputers, mainframe computers, personal computers, hand-held computing devices, microprocessor-based, programmable consumer electronics, combinations thereof, and the like. Memory 502 and memory 502 are examples of computer storage media.

The computer storage media may include volatile memory (such as random access memory (RAM)) and/or non-volatile memory (such as read-only memory (ROM), flash memory, etc.). The computer storage media may also include additional removable storage and/or non-removable storage including, but not limited to, flash memory, magnetic storage, optical storage, and/or tape storage that may provide non-volatile storage of computer-readable instructions, data structures, program modules, and the like.

A non-transient computer storage medium is an example of computer-readable media. Computer-readable media includes at least two types of computer-readable media, namely computer storage media and communications media. Computer storage media includes volatile and non-volatile, removable and non-removable media implemented in any process or technology for storage of information such as computer-readable instructions, data structures, program modules, or other data. Computer storage media includes, but is not limited to, phase change memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanism. As defined herein, computer storage media do not include communication media.

The computer-readable instructions stored on one or more non-transitory computer storage media that, when executed by one or more processors, may perform operations described above with reference to FIGS. 1-3. Generally, computer-readable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A method within a wireless communication network, the method comprising:
   receiving, from a communication device, a packet data protocol (PDP) connectivity request, wherein the PDP connectivity request comprises a request for an identity of a domain name system (DNS) of the wireless communication network;
   providing, to the communication device, a PDP connectivity response, wherein the PDP connectivity response comprises the identity of the DNS of the wireless communication network;
   receiving, from the communication device, a request to connect to a data network via the wireless communication network, wherein the receiving comprises receiving, from the communication device, a create session request;
   providing, to the communication device, a create session response message, wherein the create session response message comprises (i) a configuration setting for the communication device to use DNS internet protocol (IP) addresses provided by an operator of the wireless communication network when accessing the data network and (ii) a data bit disabling the communication device from overriding the configuration setting,
   facilitating connection of the communication device to the data network via the wireless communication network.

2. The method of claim 1, further comprising:
   monitoring data traffic of the communication device with respect to the data network via the wireless communication network.

3. The method of claim 2, further comprising:
   based at least in part on the data traffic, offering a service to a user of the communication device.

4. The method of claim 3, wherein the service comprises one or more of (i) additional data allowance, (ii) additional data at a reduced fee, or (iii) one or more offers with respect to websites visited.

5. The method of claim 3, wherein the service comprises one or more of (i) one or more offers with respect to gaming or (ii) one or more offers with respect to products.

6. A non-transitory storage medium comprising instructions stored thereon, the instructions being executable by one or more processors to perform actions comprising:
   receiving, from a communication device, a packet data protocol (PDP) connectivity request, wherein the PDP connectivity request comprises a request for an identity of a domain name system (DNS) of a wireless communication network;
   providing, to the communication device, a PDP connectivity response, wherein the PDP connectivity response comprises the identity of the DNS of the wireless communication network;
   receiving, from a communication device, a request to connect to a data network via the wireless communication network, wherein the receiving comprises receiving, from the communication device, a create session request;
   providing, to the communication device, a create session response message, wherein the create session response message comprises (i) a configuration setting for the communication device to use DNS internet protocol (IP) addresses provided by an operator of the wireless communication network when accessing the data network and (ii) a data bit disabling the communication device from overriding the configuration setting,
   facilitating connection of the communication device to the data network via the wireless communication network.

7. The non-transitory storage medium of claim 6, wherein the actions further comprise:
   monitoring data traffic of the communication device with respect to the data network via the wireless communication network.

8. The non-transitory storage medium of claim 7, wherein the actions further comprise:
   based at least in part on the data traffic, offering a service to a user of the communication device.

9. The non-transitory storage medium of claim 8, wherein the service comprises one or more of (i) additional data allowance, (ii) additional data at a reduced fee, or (iii) one or more offers with respect to websites visited.

10. The non-transitory storage medium of claim 8, wherein the service comprises one or more of (i) one or more offers with respect to gaming or (ii) one or more offers with respect to products.

11. An apparatus comprising:
    one or more processors; and
    a non-transitory storage medium comprising instructions stored thereon, the instructions being executable by the one or more processors to cause the processors to perform one or more actions comprising:

receiving, from a communication device, a packet data protocol (PDP) connectivity request, wherein the PDP connectivity request comprises a request for an identity of a domain name system (DNS) of a wireless communication network;

providing, to the communication device, a PDP connectivity response, wherein the PDP connectivity response comprises the identity of the DNS of the wireless communication network;

receiving, from a communication device, a request to connect to a data network via the wireless communication network, wherein the receiving comprises receiving, from the communication device, a create session request;

providing, to the communication device, a create session response message, wherein the response message comprises (i) a configuration setting for the communication device to use DNS internet protocol (IP) addresses provided by an operator of the wireless communication network when accessing the data network and (ii) a data bit disabling the communication device from overriding the configuration setting facilitating connection of the communication device to the data network via the wireless communication network.

12. The apparatus of claim 11, wherein the actions further comprise:

monitoring data traffic of the communication device with respect to the data network via the wireless communication network.

13. The apparatus of claim 12, wherein the actions further comprise:

based at least in part on the data traffic, offering a service to a user of the communication device.

14. The apparatus of claim 13, wherein the service comprises one or more of (i) additional data allowance, (ii) additional data at a reduced fee, (iii) one or more offers with respect to websites visited, (iv) one or more offers with respect to gaming, or (v) one or more offers with respect to products.

15. The method of claim 1, wherein facilitating the connection of the communication device further comprises:

facilitating the connection of the communication device to the data network through a DNS IP address of the DNS IP addresses.

16. The non-transitory storage medium of claim 6, wherein facilitating the connection of the communication device further comprises:

facilitating the connection of the communication device to the data network through a DNS IP address of the DNS IP addresses.

17. The apparatus of claim 11, wherein facilitating the connection of the communication device further comprises:

facilitating the connection of the communication device to the data network through a DNS IP address of the DNS IP addresses.

18. The method of claim 1, wherein the DNS includes a first DNS server in the wireless communication network and a second DNS server external to the wireless communication network.

19. The non-transitory storage medium of claim 6, wherein the DNS includes a first DNS server in the wireless communication network and a second DNS server external to the wireless communication network.

20. The apparatus of claim 11, wherein the DNS includes a first DNS server in the wireless communication network and a second DNS server external to the wireless communication network.

* * * * *